(12) United States Patent
Martens

(10) Patent No.: US 9,797,548 B1
(45) Date of Patent: Oct. 24, 2017

(54) BRACKET FOR RETAINING A DISASSEMBLED RIFLE

(71) Applicant: Paul Martens, Franklin, WI (US)

(72) Inventor: Paul Martens, Franklin, WI (US)

( * ) Notice: Subject to any disclaimer, the term of this patent is extended or adjusted under 35 U.S.C. 154(b) by 0 days.

(21) Appl. No.: 15/343,416

(22) Filed: Nov. 4, 2016

Related U.S. Application Data

(60) Provisional application No. 62/256,163, filed on Nov. 17, 2015.

(51) Int. Cl.
| | | |
|---|---|---|
| *F41A 17/00* | (2006.01) | |
| *F16M 13/02* | (2006.01) | |
| *F41A 11/00* | (2006.01) | |
| *F16B 21/06* | (2006.01) | |
| *F16B 19/00* | (2006.01) | |
| *F41C 7/00* | (2006.01) | |

(52) U.S. Cl.
CPC ............. *F16M 13/02* (2013.01); *F16B 19/00* (2013.01); *F16B 21/06* (2013.01); *F41A 11/00* (2013.01); *F41C 7/00* (2013.01)

(58) Field of Classification Search
CPC .. F41A 17/44; F41A 11/00; F41C 7/00; F16B 21/06
USPC ................................ 248/674; 42/70.11, 108
See application file for complete search history.

(56) References Cited

U.S. PATENT DOCUMENTS

| | | | | |
|---|---|---|---|---|
| 2012/0042554 A1* | 2/2012 | Rich | ....................... | F41A 35/02 42/16 |
| 2015/0000173 A1* | 1/2015 | Griffin | .................... | F41C 27/06 42/105 |
| 2017/0138681 A1* | 5/2017 | Norton | ..................... | F41A 3/28 |

\* cited by examiner

*Primary Examiner* — Todd M Epps
(74) *Attorney, Agent, or Firm* — Donald J. Ersler

(57) ABSTRACT

A bracket for retaining a disassembled rifle preferably includes a retention bracket and a pair of retractable spring pins. The retention bracket includes a base plate, a first yoke, a second yoke, a first lug and a second lug. The two lugs and the two yokes extend upward from a top of the base plate. A width of the lug slot is sized to receive a lug projection of an upper receiver half of a rifle. The two retractable spring pins are retained in the first and second yokes. The first and second lug holes are sized to receive a spring pin of a lower receiver half of a rifle. A second embodiment of the rifle bracket includes a retention bracket with yokes that extend from a side of a base plate and two lugs that extend from an opposing side of the base plate.

20 Claims, 4 Drawing Sheets

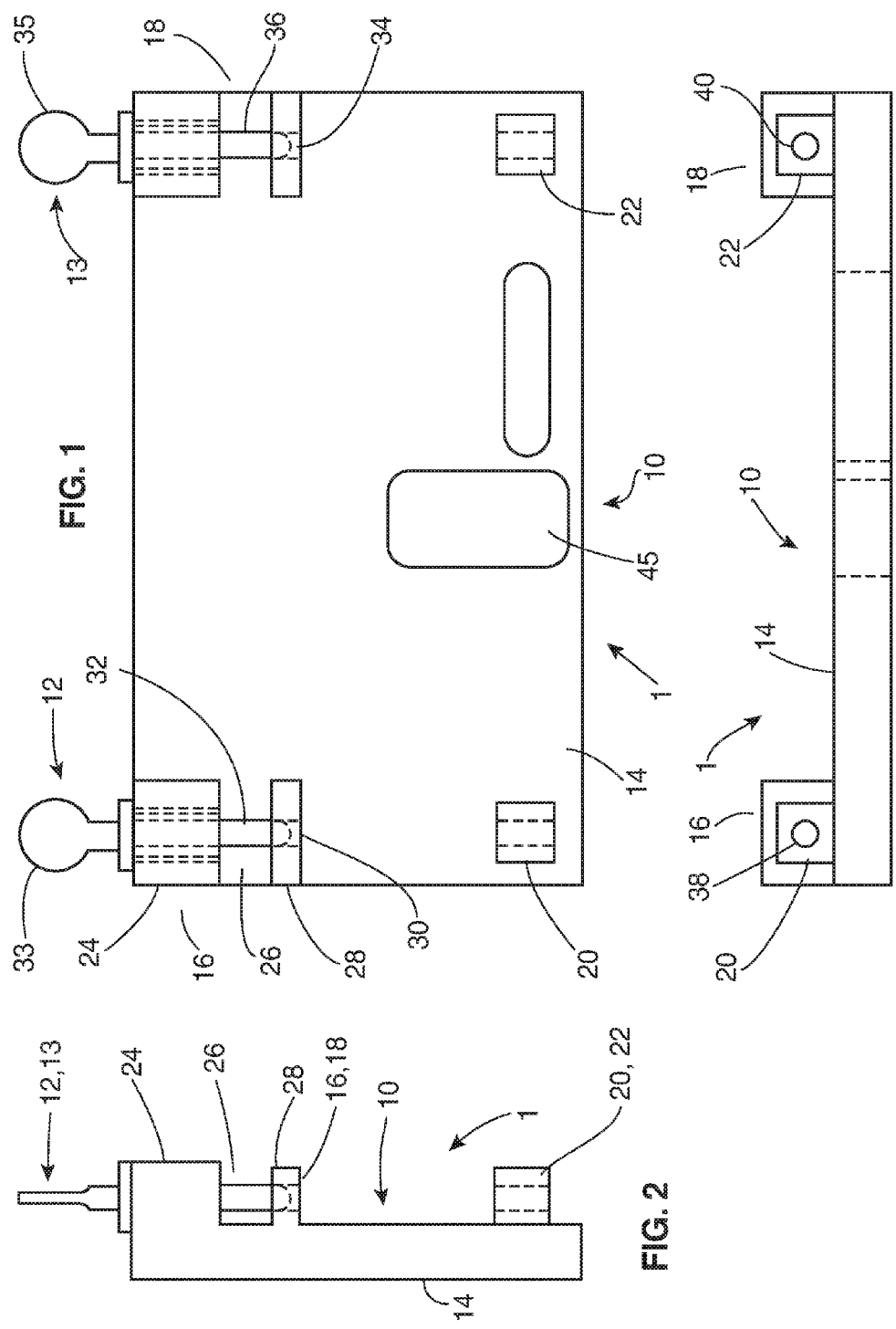

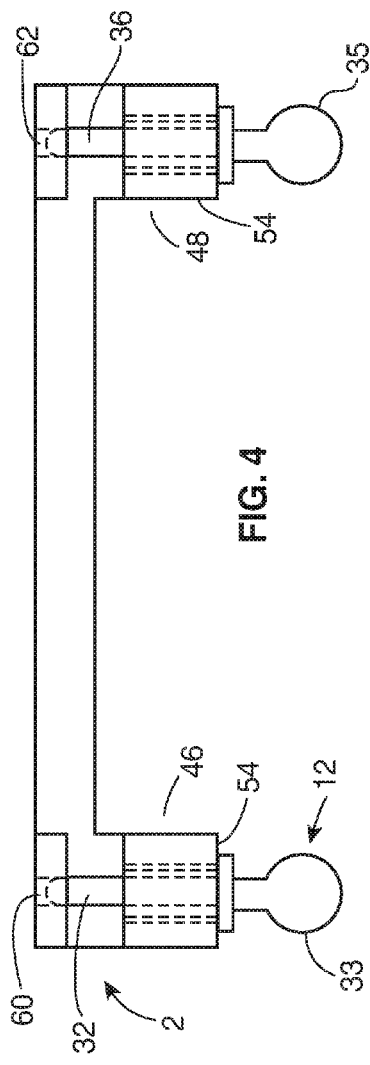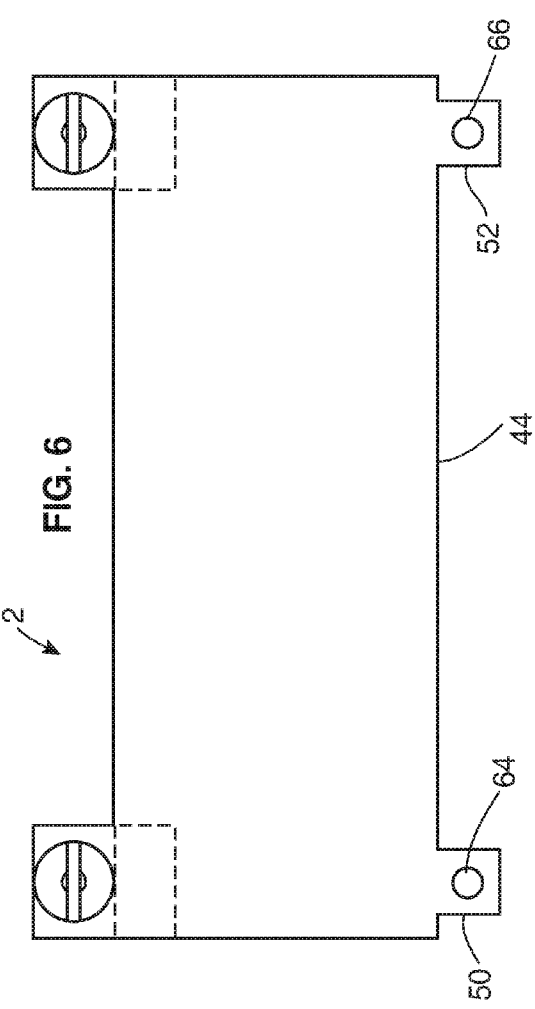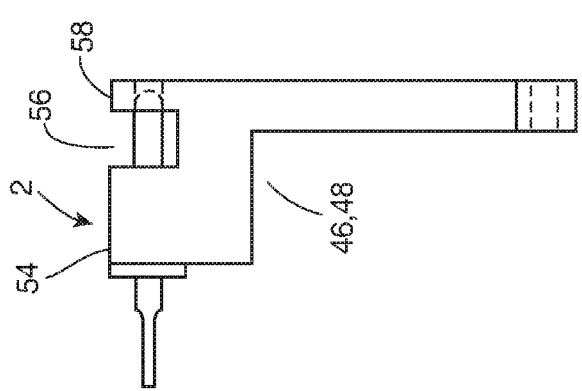

BRACKET FOR RETAINING A DISASSEMBLED RIFLE

CROSS-REFERENCES TO RELATED APPLICATIONS

This is a utility patent application taking priority from provisional application No. 62/256,163 filed on Nov. 17, 2015.

BACKGROUND OF THE INVENTION

1. Field of the Invention

The present invention relates generally to firearms and more specifically to a bracket for retaining a disassembled rifle, which allows the rifle to be secured in a quick and compact manner.

2. Discussion of the Prior Art

It appears that the prior art does not teach or suggest a bracket for retaining a disassembled rifle, such as an AR-10, AR-15 or any other applicable rifle, which is fabricated from a single piece of material.

Accordingly, there is a clearly felt need in the art for a disassembled rifle, which allows the rifle to be secured in a quick and compact manner.

SUMMARY OF THE INVENTION

The present invention provides a bracket for retaining a disassembled rifle, which is fabricated from a single piece of material. The bracket for retaining a disassembled rifle (rifle bracket) preferably includes a retention bracket and a pair of retractable spring pins. The retention bracket includes a base plate, a first yoke, a second yoke, a first lug and a second lug. The two lugs and the two yokes extend upward from a top of the base plate. The first yoke is located at a first end and a first side of the base plate. The second yoke is located at a second end and the first side of the base plate. The first lug is located at the first end and at a second side of the base plate. The second lug is located at the second end and the second side of the base plate.

Each yoke includes a first leg, a lug slot and a second leg. The lug slot is formed between the first leg and the second leg. A width of the lug slot is sized to receive a lug projection of an upper receiver half of an AR-10, AR-15 or any other applicable rifle. A first retractable spring pin is retained in the first leg of the first yoke and a first yoke hole is preferably formed through the second leg of the first yoke to receive a first lock pin of the first retractable spring pin. A second retractable spring pin is retained in the second leg of the second yoke and a second yoke hole is preferably formed through the second leg of the second yoke to receive a second lock pin of the second retractable spring pin. Retractable spring pins are well known in the art and may be purchased from any one of numerous manufacturers. A first lug hole is formed through the first lug and substantially parallel to the top of the base plate. A second lug hole is formed through the second lug and substantially parallel to the top of the base plate. The first and second lug holes are sized to receive a spring pin of a lower receiver half of an AR-10, AR-15 or any other applicable rifle.

A second embodiment of the rifle bracket includes a retention bracket and the pair of retractable spring pins. The retention bracket includes a base plate, a first yoke, a second yoke, a first lug and a second lug. The two lugs extend outward from one side of the base plate and the two yokes extend outward from an opposing side of the base plate. The first yoke is located at a first end of the base plate and the second yoke is located at a second end of the base plate. The first lug is located at the first end of the base plate and the second lug is located at the second end of the base plate.

In use, the first and second lock pins of the retractable spring pins are pulled back; the lugs of the upper receiver half are inserted into lug slots of the first and second yokes; lock pins of the first and second retractable spring pins are released; and the lock pins are pushed-in to ensure engagement with the lug holes. Lug cavities of the lower receiver half are placed over the first and second lugs and the spring pins of the lower receiver half are engaged with lugs holes of the first and second lugs.

Accordingly, it is an object of the present invention to provide a rifle bracket, which allows the rifle to be secured in a quick and compact manner.

Finally, it is another object of the present invention to provide a rifle bracket, which is fabricated from a single piece of material.

These and additional objects, advantages, features and benefits of the present invention will become apparent from the following specification.

BRIEF DESCRIPTION OF THE DRAWINGS

FIG. 1 is a top view of a rifle bracket in accordance with the present invention.

FIG. 2 is an end view of a rifle bracket in accordance with the present invention.

FIG. 3 is a front view of a rifle bracket in accordance with the present invention.

FIG. 4 is a top view of a second embodiment of a rifle bracket in accordance with the present invention.

FIG. 5 is an end view of a second embodiment of a rifle bracket in accordance with the present invention.

FIG. 6 is a front view of a second embodiment of a rifle bracket in accordance with the present invention.

DETAILED DESCRIPTION OF THE PREFERRED EMBODIMENTS

Figure 7:
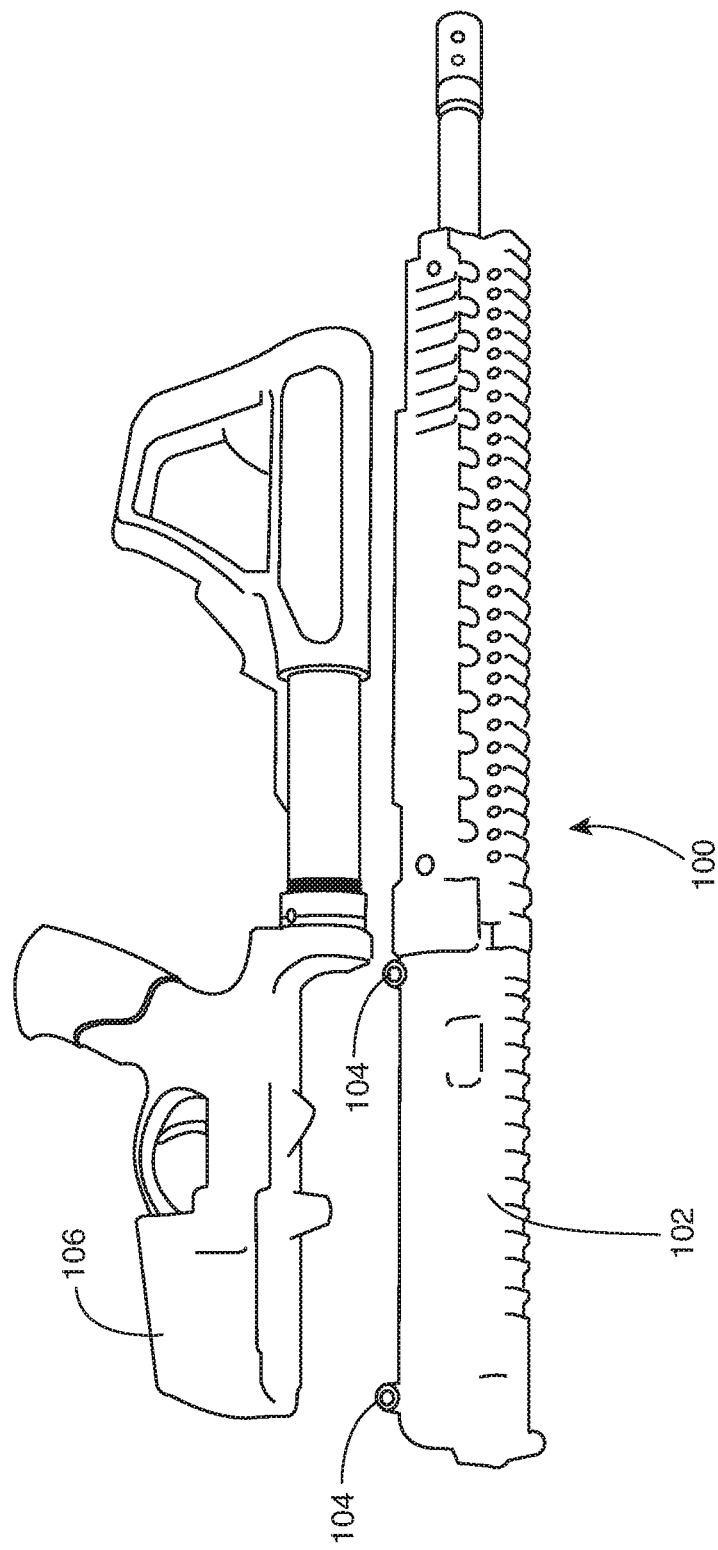
FIG. 7 is a top view of a lower receiver half and an upper receiver half of an AR-10 or AR-15 rifle.

With reference now to the drawings, and particularly to FIG. 1, there is shown a top view of a rifle bracket 1. With reference to FIGS. 2-3, the rifle bracket 1 preferably includes a retention bracket 10, a first retractable spring pin 12 and a second retractable spring pin 13. The retention bracket 10 includes a base plate 14, a first yoke 16, a second yoke 18, a first lug 20 and a second lug 22. The two lugs 20, 22 and the two yokes 16, 18 preferably extend upward from a top of the base plate 14. The first yoke 16 is located at a first end and a first side of the base plate 14. The second yoke 18 is located at a second end and the first side of the base plate 14. The first lug 20 is located at the first end and at a second side of the base plate 14. The second lug 22 is located at the second end and the second side of the base plate 14.

Figure 8:
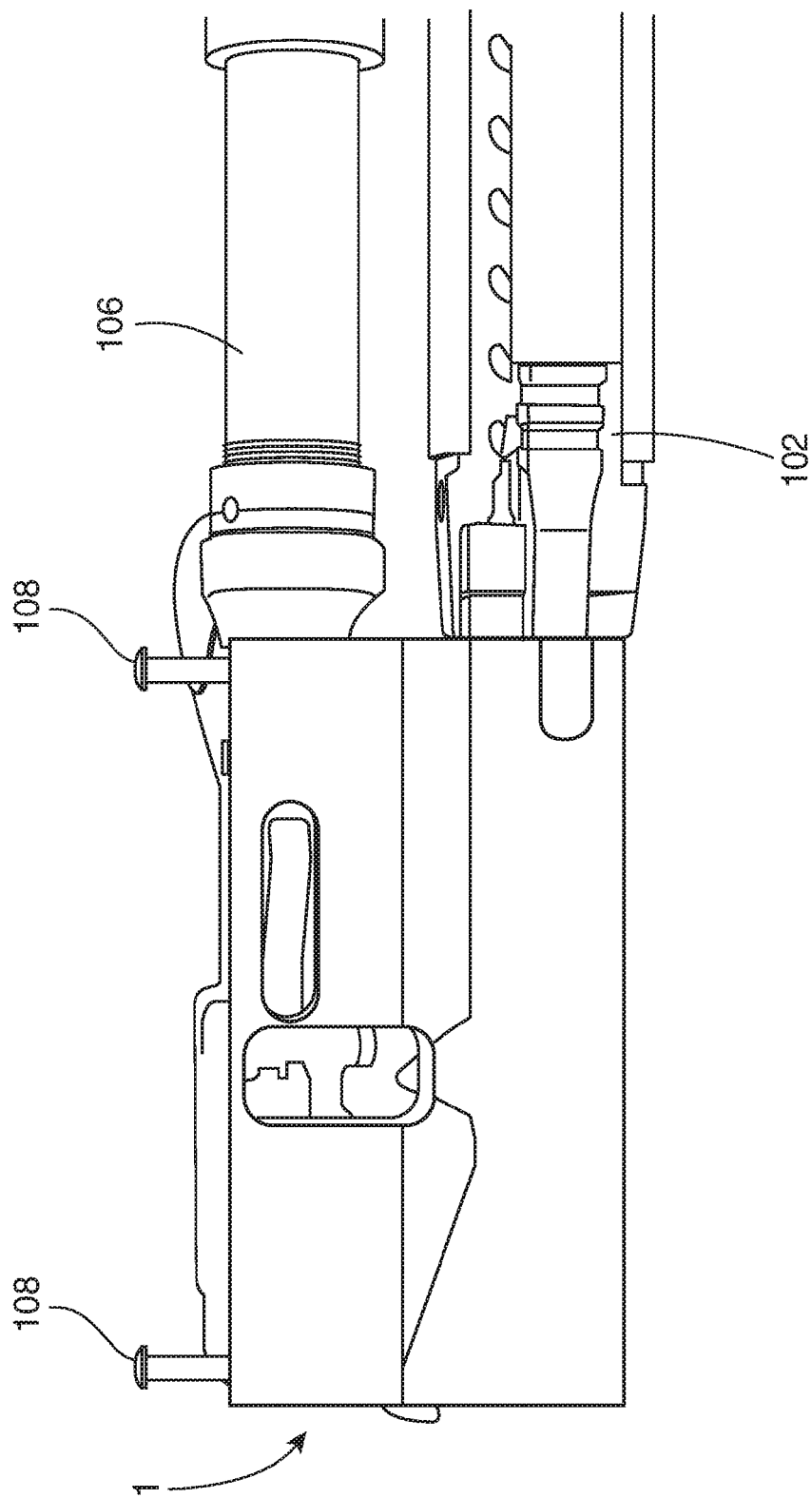
FIG. 8 is a perspective view of a lower receiver half secured to an upper receiver half of an AR-10 or AR-15 rifle with a rifle bracket in accordance with the present invention.

Each yoke 16, 18 includes a first leg 24, a lug slot 26 and a second leg 28. The lug slot 26 is formed between the first leg 24 and the second leg 28. With reference to FIG. 7, a width of the lug slot 26 is sized to receive a lug projection 104 of an upper receiver half 102 of a partially disassembled AR-15 rifle 100. The first retractable spring pin 12 is retained in the first leg 24 of the first yoke 16 and a first yoke hole 30 is preferably formed through the second leg 28 of the first yoke 16 to receive a first lock pin 32 of the first retractable spring pin 12. A second retractable spring pin 13 is retained in the first leg 24 of the second yoke 18 and a second yoke hole 34 is preferably formed through the second leg 28 of the second yoke 18 to receive a second lock pin 36 of the second retractable spring pin 13. Retractable spring pins are well known in the art and may be purchased from any one of numerous manufacturers. A first lug hole 38 is formed through the first lug 20 and substantially parallel to the top of the base plate 14. A second lug hole 40 is formed through the second lug 22 and substantially parallel to the top of the base plate 14. With reference to FIG. 8, the first and second lug holes 38, 40 are sized to receive two spring pins 108 of a lower receiver half 106 of the disassembled AR-15 rifle 100. At least one opening 45 is formed through the base plate to provide clearance for a portion of the lower receiver half 106.

With reference to FIGS. 4-6, a second embodiment of the rifle bracket 2 includes a retention bracket 42, the first retractable spring pin 12 and the second retractable spring pin 13. The retention bracket 42 includes a base plate 44, a first yoke 46, a second yoke 48, the first lug 50 and the second lug 52. The two lugs 50, 52 extend outward from one side of the base plate 44 and the two yokes 46, 48 extend outward from an opposing side of the base plate 44. The first yoke 46 is located at a first end of the base plate 44 and the second yoke 48 is located at a second end of the base plate. The first lug 50 is located at the first end of the base plate 44 and the second lug 52 is located at the second end of the base plate 44. Each yoke 46, 48 includes a first leg 54, a lug slot 56 and a second leg 58. The lug slot 56 is formed between the first leg 54 and the second leg 58. With reference to FIG. 7, the width of the lug slot 56 is sized to receive the lug projection 104 of an upper receiver half 102 of the partially disassembled AR-15 rifle 100. The first retractable spring pin 12 is retained in the first leg 54 of the first yoke 46 and a first yoke hole 60 is preferably formed through the second leg 58 of the first yoke 46 to receive the first lock pin 32 of the first retractable spring pin 12. The second retractable spring pin 13 is retained in the first leg 54 of the second yoke 48 and a second yoke hole 62 is preferably formed through the second leg 28 of the second yoke 18 to receive the second lock pin 36 of the second retractable spring pin 13. A first lug hole 64 is formed through the first lug 50. A second lug hole 66 is formed through the second lug 52 and substantially parallel to the top of the base plate 44. A first pull tab 33 is formed on an end of the first lock pin 32 and a second pull tab 35 is formed on an end of the second lock pin 35.

In use, the first and second pull tabs 33, 35 are pulled back; the lugs 104 of the upper receiver half 102 are inserted into lug slots 26 or 56 of the first and second yokes 16, 18 or 56, 58; lock pins 32, 36 of the first and second retractable spring pins 12, 13 are released; and the lock pins 32, 36 are pushed to ensure engagement of the lock pins 32, 36 with the lug holes 38, 40 or 64, 66. A lug cavity of the lower receiver half 106 is placed over the first and second lugs 20, 22 or 50, 52 and the spring pins 108 of the lower receiver half 102 are engaged with lug holes 38, 40 or 64, 66 of the first and second lugs 20, 22, or 50, 52.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. A bracket for retaining a disassembled rifle comprising:
   a retention bracket includes a base plate, a first yoke, a second yoke, a first lug and a second lug, said first yoke, said second yoke, said first lug and said second lug extend from said base plate, a first lug hole is formed through said first lug, a second lug hole is formed through said second lug;
   a first retractable spring pin is retained in said first yoke; and
   a second retractable spring pin is retained in said second yoke, wherein said first and second yokes are capable of receiving first and second lugs of a first disassembled rifle portion, said first and second retractable spring pins are capable of being engaged with the first and second lugs of the first disassembled rifle portion, first and second spring pins of a second disassembled rifle portion are capable of being engaged with said first and second lug holes of said first and second lugs.

2. The bracket for retaining a disassembled rifle of claim 1 wherein:
   said first yoke and said second yoke each include a first leg, a lug slot and a second leg, said lug slot is formed between said first leg and said second leg, a width of said lug slot is sized to receive a lug projection of the first disassembled rifle portion.

3. The bracket for retaining a disassembled rifle of claim 2 wherein:
   said retractable spring pin is retained in said first leg.

4. The bracket for retaining a disassembled rifle of claim 3 wherein:
   a yoke hole is formed through said second leg.

5. The bracket for retaining a disassembled rifle of claim 1 wherein:
   at least one clearance opening is formed through said base plate.

6. The bracket for retaining a disassembled rifle of claim 1 wherein:
   said first yoke is located at a first end and a first side of said base plate, said second yoke is located at a second end and said first side of said base plate.

7. The bracket for retaining a disassembled rifle of claim 6 wherein:
   said first lug is located at said first end and at a second side of said base plate, said second lug is located at said second end and said second side of said base plate.

8. A bracket for retaining a disassembled rifle comprising:
   a retention bracket includes a base plate, a first yoke, a second yoke, a first lug and a second lug, said first and second yokes extend from a top of said base plate on one side of said base plate, said first and second lugs extend from said top of said base plate on an opposing side of said base plate, a first lug hole is formed through said first lug, a second lug hole is formed through said second lug;
   a first retractable spring pin is retained in said first yoke; and
   a second retractable spring pin is retained in said second yoke, wherein said first and second yokes are sized to receive first and second lugs of a first disassembled rifle portion, said first and second retractable spring pins are engaged with the first and second lugs of the first disassembled rifle portion, first and second spring pins of a second disassembled rifle portion are engaged with said first and second lug holes of said first and second lugs.

9. The bracket for retaining a disassembled rifle of claim 8 wherein:
said first yoke and said second yoke each include a first leg, a lug slot and a second leg, said lug slot is formed between said first leg and said second leg, a width of said lug slot is sized to receive a lug projection of the first disassembled rifle portion.

10. The bracket for retaining a disassembled rifle of claim 9 wherein:
said retractable spring pin is retained in said first leg.

11. The bracket for retaining a disassembled rifle of claim 10 wherein:
a yoke hole is formed through said second leg.

12. The bracket for retaining a disassembled rifle of claim 8 wherein:
at least one clearance opening is formed through said base plate.

13. The bracket for retaining a disassembled rifle of claim 8 wherein:
said first yoke is located at one end and one side of said base plate, said second yoke is located at an opposing end and said one side of said base plate.

14. The bracket for retaining a disassembled rifle of claim 13 wherein:
said first lug is located at said one end and at an opposing side of said base plate, said second lug is located at said opposing end and said opposing side of said base plate.

15. The bracket for retaining a disassembled rifle of claim 8 wherein:
said first yoke is located at one end and one side of said base plate, said second yoke is located at an opposing end and said one side of said base plate.

16. The bracket for retaining a disassembled rifle of claim 15 wherein:
said first lug is located at said one end and at an opposing side of said base plate, said second lug is located at said opposing end and said opposing side of said base plate.

17. A bracket for retaining a disassembled rifle comprising:
a retention bracket includes a base plate, a first yoke, a second yoke, a first lug and a second lug, said first and second yokes extend from one side of said base plate, said first and second lugs extend from an opposing side of said base plate, a first lug hole is formed through said first lug, a second lug hole is formed through said second lug;
a first retractable spring pin is retained in said first yoke; and
a second retractable spring pin is retained in said second yoke, wherein said first and second yokes are sized to receive first and second lugs of a first disassembled rifle portion, said first and second retractable spring pins are engaged with the first and second lugs of the first disassembled rifle portion, first and second spring pins of a second disassembled rifle portion are engaged with said first and second lug holes of said first and second lugs.

18. The bracket for retaining a disassembled rifle of claim 17 wherein:
said first yoke and said second yoke each include a first leg, a lug slot and a second leg, said lug slot is formed between said first leg and said second leg, a width of said lug slot is sized to receive a lug projection of the first disassembled rifle portion.

19. The bracket for retaining a disassembled rifle of claim 18 wherein:
said retractable spring pin is retained in said first leg.

20. The bracket for retaining a disassembled rifle of claim 19 wherein:
a yoke hole is formed through said second leg.

* * * * *